United States Patent [19]

Hale

[11] 4,179,255
[45] Dec. 18, 1979

[54] MELT CUTTER APPARATUS

[75] Inventor: Alan D. Hale, Orange, Tex.

[73] Assignee: E. I. Du Pont de Nemours and Company, Wilmington, Del.

[21] Appl. No.: 886,262

[22] Filed: Mar. 13, 1978

[51] Int. Cl.² .............................................. B29C 17/14
[52] U.S. Cl. ...................................... 425/67; 264/142; 425/311; 425/313; 425/382 R; 425/464
[58] Field of Search ................ 425/378, 311, 67, 464, 425/313, 382 R; 264/141, 142

[56]  References Cited
U.S. PATENT DOCUMENTS

| 2,286,405 | 6/1942 | Gordon | 264/142 |
| 2,539,916 | 1/1951 | Ludington et al. | 264/142 |
| 3,029,466 | 4/1962 | Guill | 425/378 |
| 3,222,797 | 12/1965 | Zies | 264/142 |
| 3,389,204 | 6/1968 | Hafliger | 264/142 |
| 3,981,959 | 9/1976 | Cuff | 264/169 |
| 4,021,176 | 5/1977 | Dettmer et al. | 264/142 |

FOREIGN PATENT DOCUMENTS

| 1438015 | 12/1966 | France | 264/203 |
| 1476971 | 4/1967 | France | 264/141 |

Primary Examiner—Jay H. Woo

[57]  ABSTRACT

An improved melt cutter apparatus for producing pellets from a strand of a partly molten thermoplastic resin in cooperation wth an extrusion die is provided. The apparatus comprises a drive shaft, a drive rod rotatably connected thereto, a knife holder connected rotatably to the drive rod, a knife attached thereto and means for advancing the knife toward the extrusion die.

12 Claims, 2 Drawing Figures

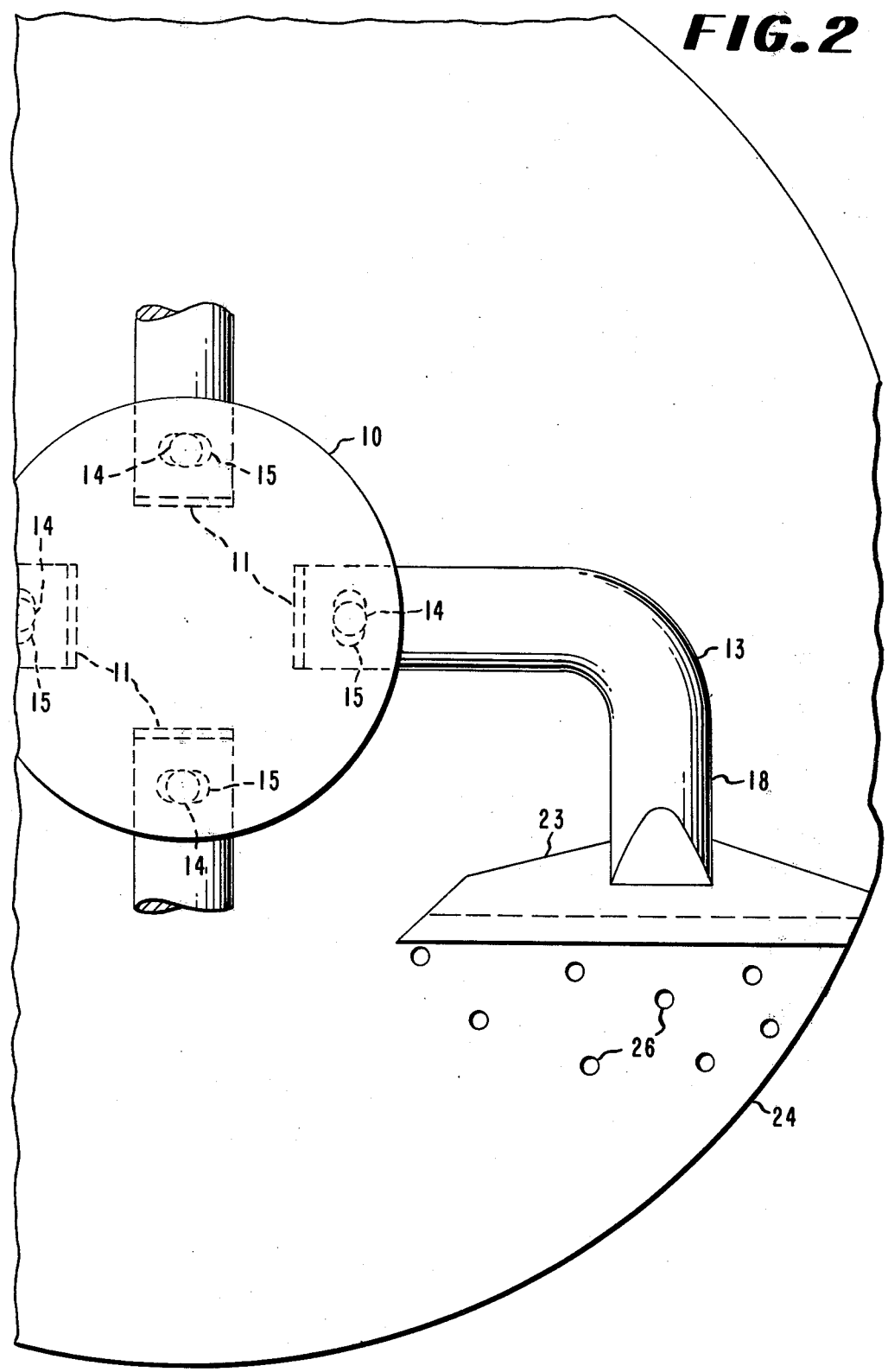

MELT CUTTER APPARATUS

BACKGROUND OF THE INVENTION

1. Field of the Invention

This invention relates to an apparatus for forming pellets, or granules, from extruded strands of a thermoplastic material.

More specifically, this invention involves an improved rotary cutter apparatus cooperating with a die structure defining one or more melt extrusion orifices and adapted for operation while submerged in a cooling medium. The medium cools the thermoplastic material which usually is extruded through the orifices of the die in molten form.

2. Description of the Prior Art

It has been found, in working with conventional melt cutter devices, that the maintenance of the clearance between the knife and the die is very important and critical for proper cutting action. If this clearance becomes too large, for example as the result of excessive wear of the knife or variations in extrusion temperatures or pressures, poor and incomplete cutting action results and the quantity of fines produced generally increases. Pellets of thermoplastic polymers used in extrusion, injection molding, or blow molding processes are preferably desired to be free of fines, uniform in size, and with cleanly cut surfaces in order to enable them to be free flowing, and thereby avoid a possible variable volumetric feed to the injection, extrusion, or blow molding device.

Conversely, if the clearance between the knife and the die is reduced to zero, and if there is significant friction between them for example, as the result of bulging of the die face toward the knife, which may be caused by pressure of the molten thermoplastic against the die, severe wear of the knife as well as the die occurs. Scoring of the expensive die and knife breakage are also likely to occur.

Therefore, an object of this invention is the provision of an improved melt cutter apparatus for producing thermoplastic pellets or granules of uniform size and shape from thermoplastics. A particular object is the provision of a liquid phase melt cutter apparatus which will function effectively for long periods of time with a minimum amount of attention to the clearance between the knife and the die, a minimum production of fines, a minimum of knife breakage and wear, a minimum of die scoring and wear, and a minimum of adjustment or service during the operating life of the apparatus, particularly when starting up or shutting down the melt cutter apparatus.

SUMMARY OF THE INVENTION

The process for extruding and cutting a partially molten thermoplastic resin into the form of discrete pellets or granules, accomplished with the aid of the improved melt cutter apparatus of the present invention, comprises continuous extrusion of strands of the molten thermoplastic resin through one or more orifices, formed in a die face, directly into a cooling medium, and cutting the extruded strand (s) within the cooling medium into pellets or granules as the latter are undergoing solidification.

The objects of the present invention are accomplished by the use of an improved rotary melt cutter apparatus for producing pellets from a strand or strands of a partly molten thermoplastic resin in cooperation with an extrusion die, said extrusion die having a die surface intersected by one or more extrusion orifices, said improved rotary melt cutter apparatus adapted to be driven rotationally by a rotating shaft structure, said apparatus comprising rotating knife assembly and means connecting said assembly to said rotating shaft structure, said rotating knife assembly comprising a drive rod connected to said shaft structure, a knife holder and attached thereto an approximately center-supported knife, said drive rod cooperating with said knife assembly connecting means such that said drive rod has limited free rotation about its axis running to said rotating shaft structure, said knife holder being connected to said drive rod, said rotating knife assembly mounted and supported in cooperative association with said die surface and said orifices of said extrusion die such that the plane of rotation of said knife assembly about the axis of said rotating shaft structure is maintained adjacent and in alignment substantially parallel to said die surface and said orifices such that only a limited amount of wear of both the knife and the die occurs during operation, and means for advancing said rotating knife assembly toward said die surface and said extrusion orifices.

DESCRIPTION OF THE DRAWINGS

The above and other objects are accomplished by the novel features of the present invention which will become apparent from the following description having reference to the annexed drawings wherein:

FIG. 2 is an end view of the melt cutter looking in the direction of the extrusion die 24.

Like reference numerals indicate like parts throughout the several views of the drawings.

DETAILED DESCRIPTION OF THE INVENTION

Figure 1:
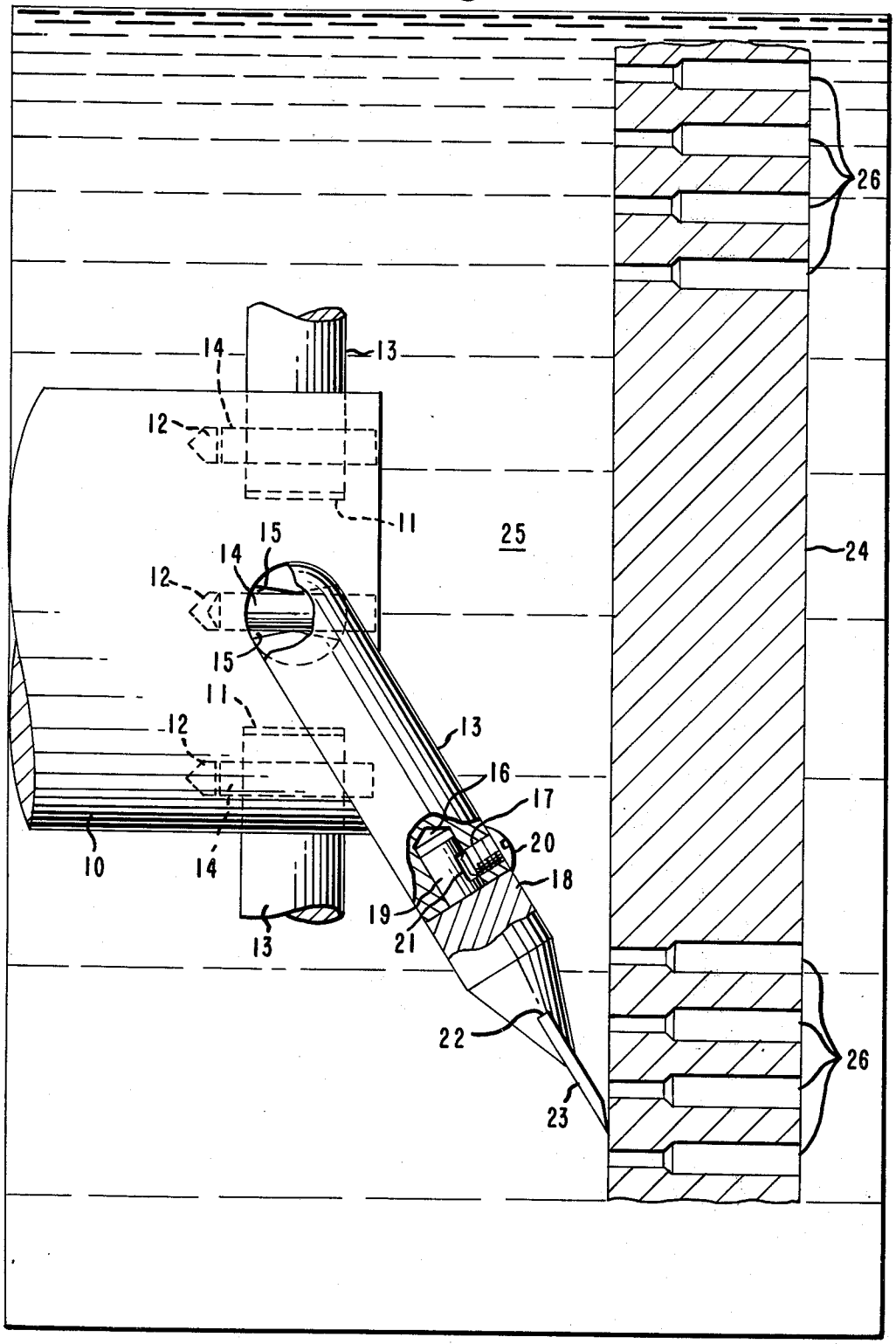
FIG. 1 is a side elevation, partly in section, of the melt cutter apparatus.

Referring to the drawings, there is shown therein a portion of the cantilevered rotating drive shaft 10 suitably removed from die face 24 to minimize or eliminate cavitation, with cylindrical holes 11 that are preferably, but not necessarily radial, positioned near its cantilevered end, and smaller axial holes 12 centered radially at, and in the middle of the cylindrical holes 11. Drive rods 13 that can be, but are not necessarily, cylindrical are positioned in cylindrical holes 11, and are suitably retained therein whereby limited free rotation of rod 13 in hole 11 is assured, for example by dowel pin 14 pressed into axial hole 12 which is aligned with elongated hole 15 in rod 13 near this inner end of rod 13. Drive rod 13 is preferably, but not necessarily, curved or angled such that the outer end axis is near the center of and in the general direction of the knife rotation. This outer end of drive rod 13 has an axially centered hole 16, and there is a conveniently, but not necessarily, radial threaded hole 17 extending through this outer end of drive rod 13 to and positioned near the center of axial hole 16. Knife holder 18 that can be, but is not necessarily, cylindrical at one end thereof has a concentric reduced cylindrical portion 19, which is retained in axial hole 16 and to a limited extent is free to rotate therein. Reduced cylindrical portion 19 can, for instance, be so retained by a bolt 20 in threaded hole 17 engaging tangential flat 21 centered on reduced cylindrical portion 19. The opposite end of knife holder 18 has a diametrical slot 22 into which is received and held by appropriate means, such as silver solder, a knife 23 that is slanted toward, and generally on a radius with, the die 24. Knife 23 is approximately center-supported in knife holder 18, i.e., it is held therein somewhere along the middle third of its length.

Die 24 has preferably, but not necessarily a planar face, however, the rotary melt cutter apparatus of the present invention is suitable for operation in cooperation with other die configurations, such as conical or cylindrical. Rotation of knife 23 through the cooling liquid 25 in a plane parallel to the die face 24 causes knife 23 to ride parallel to and substantially against the die face 24 for optimum severing of polymer strands 26.

Elongated hole 15 in rod 13 should be such that the initial start-up of the melt cutter apparatus will result in movement of knife 23 toward die 24 and that it allows sufficient rotation of drive rod 13 to maintain substantially zero clearance between the knife and the die face during the entire life of said knife.

Likewise, knife holder 18 should have sufficient free rotation in drive rod 13 such that knife 23 can always be parallel with die face 24.

FIG. 1 shows the entire melt cutter assembly submerged in a cooling liquid 25.

Before the apparatus of the present invention is operated, the drive shaft 10 is adjusted axially to provide a predetermined knife-to-die angle that provides the optimum melt cutting/knife life/self-sharpening performance. The angle can be between about 5° and 85° preferably, however, it is between about 20°–40°.

As the melt cutter apparatus is operated, the pumping or hydraulic action of knife 23 against cooling liquid 25 creates a force on knife 23 advancing same toward die 24. The knife is free to move toward and against the die because of the limited free rotation of drive rods 13 in cylindrical holes 11 and of reduced cylindrical portion 19 on knife holder 18 in axial hole 16 such that essentially the full length of knife 23 contacts die 24 for optimum melt cutting and minimal fines production. Limited free rotation of the above mentioned joints, coupled with the very low inertia of the light weight flexible knives 23, assure contact of the knives on the die even with possible slight die deflections and non-perpendicularity of cutter drive shaft-to-die.

Changes in die extrusion pressures and temperature and pressure fluctuations, are known to cause variations in knife-to-die clearance with a fixed cutter design, as revealed by wide fluctuations in cutter motor amperage. Knives of the present invention are free to move with the die surface, and the melt cutter amperage remains essentially constant for optimum wear and cutting performance.

Substantial bulging of most die designs occurs at higher extrusion pressures, and non-uniform knife-to-die clearance along the length of the knife exists as evidenced by the much higher wear rate toward the inner portion of the die. Knives of the present invention do not display this undesirable wear pattern because they are free to adjust with the die bulging. Also, some flexibility exists in the knife itself, and this aids in maintaining minimum clearance at all times even with very slight curvature along the die cutting surface.

The cooling liquid, when used with the melt cutter apparatus of the present invention is kept at a temperature below its boiling point and below that temperature at which the cut granules or pellets stick together. Water is the preferred cooling liquid but any liquid that is non-reacting with the thermoplastic resin and of any convenient viscosity can be used. The pellets can be separated from the cooling liquid by any suitable means.

Generally any suitable long-wearing metal can be used as the knife material. A preferable knife material is "Stellite 6B", a wear resistant alloy containing by weight 3% of nickel, 30% of chromium, a maximum 1.5% of molybdenum, 4.5% of tungsten, a maximum of 3% of iron, a maximum of 2% of silicon, a maximum of 2% of manganese, 1.2% of carbon and the balance cobalt, obtained from the Stellite Division of Cabot Corporation.

The knife shape and angle to drive shaft radius can be any desirable configuration, preferably one minimizing cooling liquid pumping action.

The number of knife assemblies employed can be one or more, preferably it is at least two, and most preferably it is about 4–8.

While particular embodiments of this invention are shown above, it will be understood that the invention is subject to variations and modifications without departing from its broader aspects and still within the spirit of this invention.

I claim:

1. An improved rotary melt cutter apparatus for producing pellets from at least one strand of a partly molten thermosplastic resin in cooperation with a die, said die having a die surface with at least one orifice, said improved rotary melt cutter apparatus adapted to be driven rotationally by a rotating shaft structure, said apparatus comprising rotating knife assembly and means connecting said assembly to said rotating shaft structure, said rotating knife assembly comprising a drive rod connected to said shaft structure, a knife holder and attached thereto an approximately center-supported knife, said drive rod cooperating with said knife assembly connecting means such that said drive rod has limited free rotation about its axis running to said rotating shaft structure, said knife holder being connected to said drive rod, said knife holder being axially aligned with and connected to said drive rod such that said knife holder has limited axial free rotation, said rotating knife assembly mounted and supported in cooperative association with said die surface and said orifice of said die such that the plane of rotation of said knife assembly about the axis of said rotating shaft structure is maintained adjacent and in alignment substantially parallel to said die surface and said orifice such that only a limited amount of wear of both the knife and the die occurs during operation, and means for advancing said rotating knife assembly toward said die surface and said extrusion orifice.

2. The improved rotary melt cutter apparatus of claim 1, wherein said rotating shaft structure comprises a rotating drive shaft having an axis of rotation substantially perpendicular to said die surface and orifice.

3. The improved rotary melt cutter apparatus of claim 2, wherein said means for connecting said rotating knife assembly to said rotating shaft structure transmits the rotational movement of said rotating shaft structure to said rotating knife assembly and is comprised of a cylindrical hole positioned near the cantilevered end of the drive shaft, a smaller axial hole centered radially at and in the direction of the middle of said cylindrical hole, a drive rod positioned in said cylindrical hole, said drive rod having an elongated hole near the inner end thereof, said elongated hole being aligned with said axial hole in said drive shaft, and a dowel pin pressed into said elongated and axial holes, whereby limited free rotation of said drive rod in said cylindrical hole is provided.

4. The improved rotary melt cutter apparatus of claim 3, wherein said knife holder is axially aligned with and connected to said drive rod by means of an axially centered hole in the outer end of said drive rod, a reduced cylindrical portion on said knife holder fitting into said axially centered hole in said drive rod, a threaded hole extending through the outer end of said drive rod to and positioned near the center of said axial hole, and a bolt in said threaded hole engaging a tangential flat on said reduced cylindrical portion of said knife holder, whereby a limited free rotation of said knife holder in said drive rod is provided.

5. The improved rotary melt cutter apparatus of claim 4 wherein said drive rod is a curved or angled cylindrical rod.

6. The improved rotary melt cutter apparatus of claim 5 wherein said knife holder is cylindrical.

7. The improved rotary melt cutter apparatus of claim 4, wherein the means for advancing said rotating knife assembly toward said die surface and said orifice is comprised of a liquid in which said knife assembly is submerged, the knife of said knife assembly rotating through said liquid, and the hydraulic action of said knife against said liquid creating a force that advances said knife toward said die surface and said orifice.

8. The improved rotary melt cutter apparatus of claim 7, wherein said rotating shaft structure is sufficiently removed from said die surface to substantially eliminate cavitation.

9. An improved rotary melt cutter apparatus for producing pellets from at least one strand of a partly molten thermoplastic resin in cooperation with a die, said die having a die surface intersected by at least one orifice, said improved rotary melt cutter apparatus adapted to be driven rotationally by a rotating shaft structure, said apparatus comprising rotating knife assembly and means connecting said assembly to said rotating shaft structure, said rotating knife assembly comprising a drive rod connected to said shaft structure, a knife holder and attached thereto an approximately center-supported knife, said drive rod cooperating with said knife assembly connecting means such that said drive rod has limited free rotation about its axis running to said rotating shaft structure, said knife holder being connected to said drive rod, said rotating knife assembly mounted and supported in cooperative association with said die surface and said orifice of said extrusion die such that the plane of rotation of said knife assembly about the axis of said rotating shaft structure is maintained adjacent and in alignment substantially parallel to said die surface and said orifice such that only a limited amount of wear of both the knife and the die occurs during operation, and means for advancing said rotating knife assembly toward said die surface and said orifice comprising a liquid in which said knife assembly is submerged, the knife of said knife assembly rotating through said liquid, and the hydraulic action of said knife against said liquid creating a force that advances said knife toward said die surface and said orifice.

10. The improved rotary melt cutter apparatus of claim 9 wherein said rotating shaft structure comprises a rotating drive shaft having an axis of rotation substantially perpendicular to said die surface and orifice.

11. The improved rotary melt cutter apparatus of claim 10 wherein said drive rod is a curved or angled cylindrical rod and wherein said knife holder is cylindrical.

12. The improved rotary melt cutter apparatus of claim 11, wherein said rotating shaft structure is sufficiently removed from said die surface to substantially eliminate cavitation.

* * * * *